J. M. Horton,
Auger Handle.
No. 4187. Reissued Nov. 29. 1870.
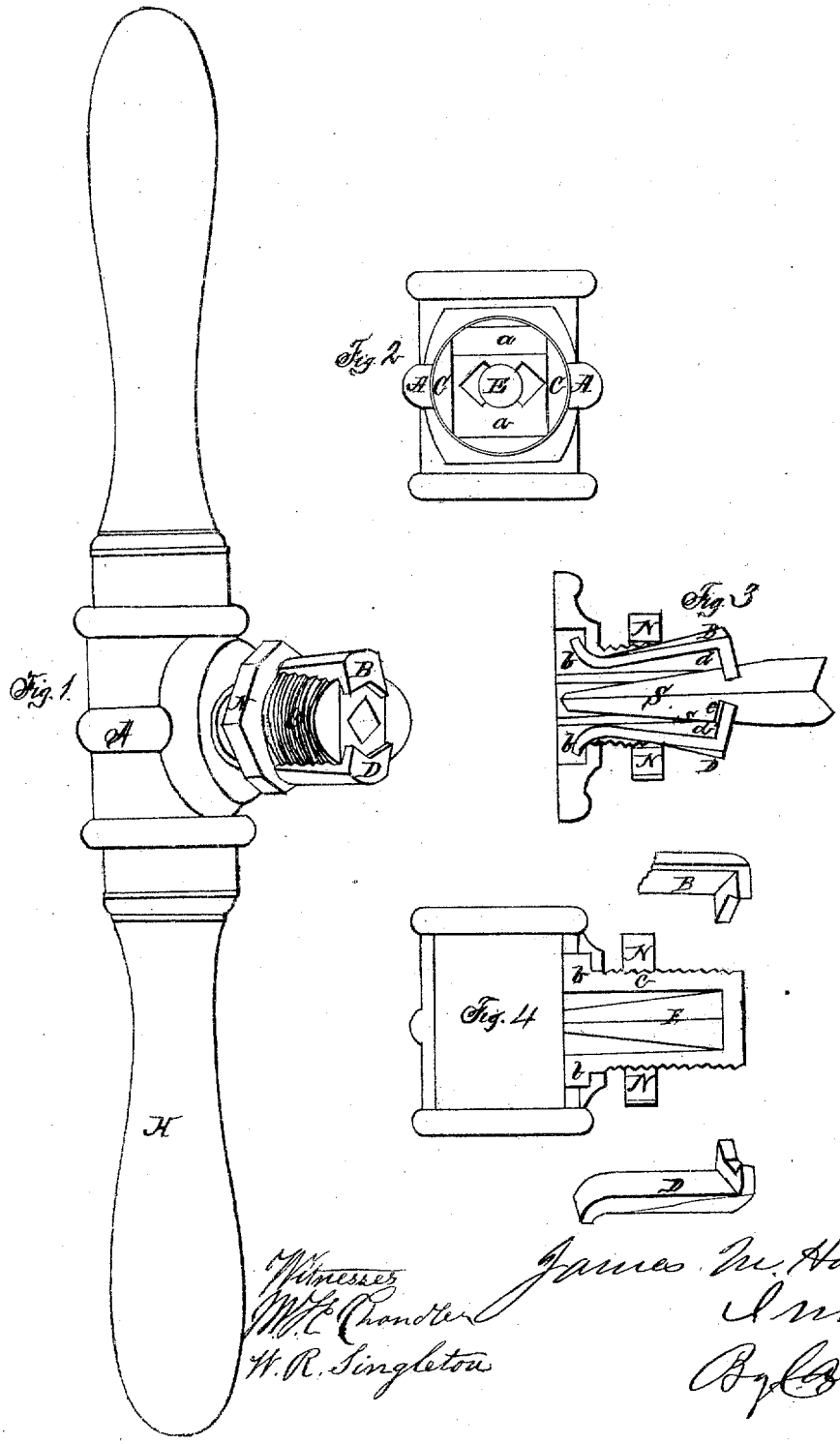
Witnesses
W. C. Chandler
W. R. Singleton
James M. Horton
Inventor
By C. A. Dugan
Atty.
N. PETERS, PHOTO-LITHOGRAPHER, WASHINGTON, D. C.

United States Patent Office.

JAMES M. HORTON, OF CHICAGO, ILLINOIS, ASSIGNOR TO "THE MILLER'S FALLS MANUFACTURING COMPANY," OF MILLER'S FALLS, MASSACHUSETTS.

Letters Patent No. 35,856, dated July 8, 1862; reissue No. 2,229, dated April 17, 1866; reissue No. 4,187, dated November 29, 1870.

IMPROVEMENT IN AUGER-HANDLES.

The Schedule referred to in these Letters Patent and making part of the same.

I, JAMES M. HORTON, formerly of Albany, in the county of Albany and State of New York, now of Chicago, in the county of Cook and State of Illinois, have invented certain new and useful Improvements in Instruments for Operating Tools, such as augers, bits for boring wood, &c., the shanks of which are of variable sizes, of which the following is a specification.

*Nature and Objects of the Invention.*

In the boring of wood the carpenter necessarily has an assortment of augers, bits, reamers, countersinks, &c., some of which he desires to use at various times, and it is of great importance to him to have a stock capable of receiving and holding for use any one of these tools.

My invention is designed and constructed to effect this purpose, and to this end It consists in certain combinations of parts herein described.

*Description of the Drawing.*

Figure 1 is a perspective view of an auger-handle, with my improvements attached thereto.

Figure 2 is a view of the socket, with the jaws removed.

Figure 3 is a vertical sectional view through the center of the socket, showing the shank of a boring-tool held in the jaws.

Figure 4 is a smaller section of the socket, showing the jaws detached.

*General Description.*

In fig. 1 H represents an auger-handle, provided with a metal band, A, around its center, the lower portion of which is formed into a projecting cylinder, C, of proper diameter.

On opposite sides of this cylinder a recess, *a a*, of proper width and depth, is sunk, and continued under and across the bottom.

The upper end of this recess terminates in a deeper recess, *b b*, within the lower portion of the band A.

The recess is to receive the jaws B and D, shown in figs. 3 and 4.

The upper end of these jaws are curved, so as to lie loosely in the cavities or recess *b b*, and act as hinges upon which the jaws swing. Their lower ends have the edges facing each other cut into angular jaws, as plainly shown in the drawing.

Along the center axis of the cylinder C there is made a rectangular tapering bore, E, sufficiently large to receive the shank of the boring-tool to be used.

The cylindrical portions of the socket C have screw-threads cut upon their periphery, and upon them a revolving nut, N, is fitted to force the jaws B D together.

The upper end, or hinge-part, of the jaws are so fitted in the recesses that their upper surfaces are below the outside range of the cylinder C, so that when the nut N is up near the handle the lower part of the jaws B D can swing or move apart, as plainly shown in the drawing, so as to receive the shanks of the boring-tool. These jaws have sufficient range of motion to hold all sizes of ordinary boring-tools, from the largest to the smallest.

In order to better hold the shank of the boring-tool from being drawn out of the jaws when drawing the tool out of the wood, a notch is made in one of the angular edges of the shank, as seen in fig. 3, and the jaw D, fig. 4, is not cut down to the depths of the angle, but a portion of the metal is left to lie in the notch *e*.

This device is especially designed for what are usually termed augers, but it is equally well adapted for all boring-tools.

*Claims.*

1. The combination of the barrel A provided with a socket C, jaws B and D, and nut N, working on a screw for holding a boring-tool, substantially in the manner described and specified.

2. The socket C of the barrel A, having cavities *b b*, in combination with the jaws B D having curved ends to fit therein, to allow the necessary lateral movement in the socket without falling out, substantially as described and specified.

Witnesses: JAS. M. HORTON.

H. H. TRACY,

R. C. EDWARDS.